Figure 1:
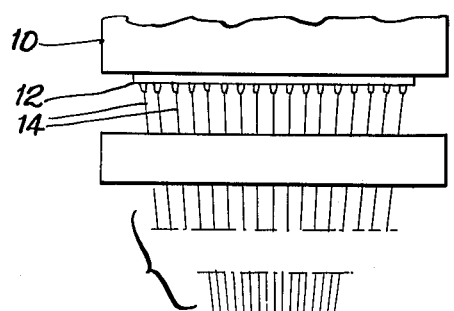
Figure 1:
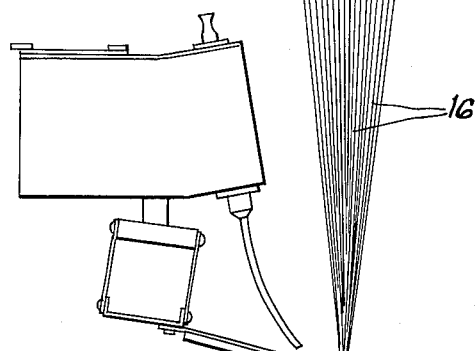

May 24, 1966     A. MARZOCCHI ET AL     3,252,278

ELASTOMERIC-GLASS FIBER PRODUCTS AND PROCESS

Filed Aug. 22, 1962

Alfred Marzocchi
Nicholas S. Janetos
INVENTORS

BY Staelin and Overman
Attys

United States Patent Office 3,252,278
Patented May 24, 1966

3,252,278
ELASTOMERIC-GLASS FIBER PRODUCTS
AND PROCESS
Alfred Marzocchi, Cumberland, and Nicholas S. Janetos, Providence, R.I., assignors to Owens-Corning Fiberglas Corporation, a corporation of Delaware
Filed Aug. 22, 1962, Ser. No. 218,723
18 Claims. (Cl. 57—153)

This invention relates to rubber or elastomeric products reinforced with glass fibers and it relates more particularly to the method and means for improving the relationship between glass fibers and elastomeric materials whereby the resulting products are characterized by improved strength, flexibility and appearance, and the invention relates also to compositions and the improved products manufactured by the described method and means.

This invention is a continuation-in-part of our copending application Ser. No. 750,253, filed July 22, 1958, and entitled "Structures Formed of Glass Fiber-Elastomer Systems."

The invention is addressed to the fuller utilization of the desirable characteristics available from glass fibers such as their strength, their flexibility, their inertness and the like when employed in combinations with the elastomeric materials, such as natural or synthetic rubbers in the manufacture of rubber coated fibers, strands or yarns and fabrics formed thereof and rubber products in which the glass fibers are embedded in the elastomeric materials such as in belting, hose, tires and the like glass fiber reinforced, elastomeric products.

It is an object of this invention to provide a means and method to improve the relationship between glass fibers, strands, yarns, cords and fabrics formed of glass fibers with elastomeric or rubber-like materials employed in combinations therewith whereby fuller utilization can be made of desirable properties of the glass fiber component in the glass fiber-elastomeric system.

More specifically, it is an object of this invention to provide materials, methods and means whereby a strong and permanent bonded relationship can be established and maintained between glass fibers and elastomeric materials employed in combinations with glass fibers in the manufacture of coated fibers and fabrics and rubber products; whereby glass fiber systems having improved strength and resistance to deterioration can be produced for use in combinations with elastomeric or rubber-like materials in the manufacture of improved glass fiber-elastomeric products; whereby separation at the interface between the glass fiber components and the matrix of elastomeric or rubber-like materials is substantially avoided thereby to enable more complete and uniform distribution of the glass fiber component in the elastomeric system for better utilization of the glass fibers, and for the fabrication of end products having new and improved characteristics, and whereby coated glass fibers can be made available as a product of manufacture for subsequent use in combinations with elastomeric materials in the manufacture of glass fiber-elastomeric products having new and improved characteristics, and it is a related object to produce new and improved glass fiber-elastomeric products.

These and other objects and advantages of this invention will hereinafter appear and for purposes of illustration, but not of limitation, an embodiment of the invention is shown in the accompanying drawings in which—

Figure 2:
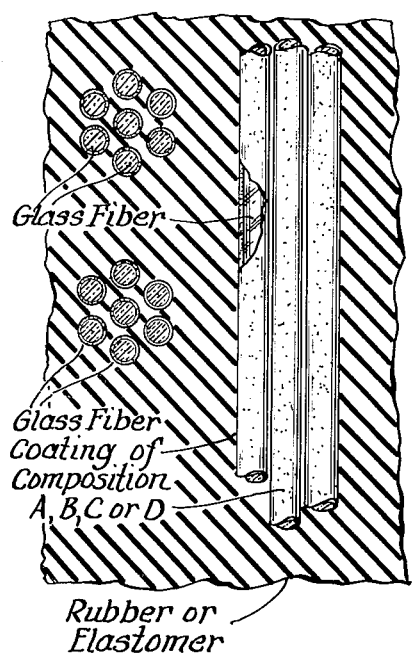
Figure 2:
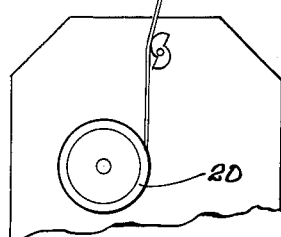

FIG. 1 is a flow diagram showing glass fiber manufacture and the treatment of the glass fibers in forming in accordance with the practice of this invention; and FIG. 2 is a sectional view of an elastomeric product embodying glass fibers treated in accordance with the practice of this invention.

To the present, glass fibers which have been added or otherwise incorporated with elastomeric materials have tended to function more as a filler than as a reinforcement, flexibilizing or stabilizing agent, with the result that little, if any, improvements in mechanical and physical properties have been made available from the combinations of glass fibers in products formed of such elastomeric materials. It is believed that the failure to make fuller utilization of some of the more desirable properties of the glass fiber component resides in the inability properly to integrate the glass fibers into the elastomeric system. As a result, the glass fibers function more as a filler than as a contributing factor in the properties of the cured, vulcanized, or other elastomeric product.

Investigations have been conducted for over the past twenty or more years by many skilled in the art in the attempt to make fuller utilization of the glass fiber component in systems formulated of elastomeric materials in the endeavor to produce products having new and improved physical and mechanical properties. Substantial inroads are now being made, as represented by the practice of this invention, as will hereinafter be described.

In the aforementioned copending application, description is made of the treatment of glass fibers prior to the combination with elastomeric materials to coat the fibers with a substance that operates to alter the electrostatic charge predominating on the glass fiber surfaces whereby the surfaces of the glass fibers will be made more attractive to elastomeric materials intended to be combined with the glass fibers. The aforementioned copending application also describes another system comprising coating the glass fibers with an anchoring agent which becomes permanently bonded or associated with the glass fiber surfaces to, in effect, become a part thereof and in which the anchoring agent embodies groupings or structure which offer attraction to or enter into the reaction with elastomeric materials to tie in the elastomer with the glass fiber surfaces to produce glass fiber-elastomeric products having improved hardness, improved tear strength, higher tensile strength, greater flexure strength and modulus of elasticity thereby to enable production of improved belting, tires, tubing, hose and the like fabricated elastomeric products.

This invention is addressed to an improvement in one of the concepts described in the aforementioned copending application wherein use is made of an anchoring agent adapted to so improve the relationship between the glass fiber component and the elastomeric component as to enable fuller utilization to be made of the glass fibers to produce elastomeric products having vastly new and improved chemical, physical and mechanical properties.

The invention will hereinafter be described with reference to the combination which makes use of endless lengths of glass fibers in the form of filaments, yarns and cords; an aminopropyltriethoxy silane as the anchoring agent, and neoprene as the elastomeric component to produce new and improved neoprene coated glass fibers which may be used as such in the fabrication of cords, rope, fabrics and the like, and the invention will be further described with reference to the use of such elastomeric coated glass fibers and the fabrication of improved endless belts thereof. It will be understood that the foregoing is to be used merely by way of illustration, and not by way of limitation, of the invention as will hereinafter appear since the glass fiber component may be employed in other forms, since other organic amino silanes may be used; since other natural or synthetic elastomeric materials may be employed, and finally since a large number of other glass fiber-elastomeric products may be produced.

As used herein, the term "elastomer" is meant to include, in addition to neoprene, such other synthetic elastomeric or rubber-like materials as butadiene, chloroprene, isoprene and the like, or copolymers thereof with acrylonitrile, styrene and the like, and especially those elastomeric materials which are curable or vulcanizable by reaction to a set stage by peroxide or through sulphur linkages, and the term is also meant to include natural rubbers and modifications thereof, such as chlorinated rubber and the like.

While the term "glass fibers" is preferably employed to define continuous glass fibers in the form of filaments, strands, yarns, bundles, cords and fabrics formed thereof, it is intended also to include discontinuous glass fibers in the form of glass wool fibers and yarns and fabrics formed thereof, or fibers of the continuous or discontinuous types which have been cut, chopped or otherwise reduced to shorter lengths but to lengths greater than about ⅛ inch.

EXAMPLE 1

Preparation of treated glass fibers:

In FIG. 1 of the drawings, schematic illustration is made of a means for the production of endless lengths of glass fibers including a glass melting furnace 10 having a bushing 12 on the bottom side thereof provided with a plurality of openings. The streams 14 of molten glass, flowing gravitationally from the openings in the bushing at the bottom side of the furnace, are rapidly attenuated into fine filaments 16 by winding the filaments, after they have been gathered together to form a strand 18, about a rapidly rotating winding drum 20.

The separate filaments are coated as they are gathered together into a single bundle or strand. For this purpose, use is made of an applicator 22 which may be in the form of a wiping pad wet with the fluid treating composition embodying one of the features of this invention and over which the glass fiber filaments, in forming, are passed as they are gathered together to form the strand 18 that is wound about the winding drum 20.

The composition applied to the glass fibers in forming is formulated to contain gamma-aminopropyltriethoxy silane as a component thereof. The gamma-aminopropyltriethoxy silane may be applied alone in solution in a suitable volatilizable carrier, as illustrated by compositions A and B, but it is preferred to embody the anchoring agent as an essential component in a conventional size composition and preferably in a size composition represented by the formulation of compositions C and D. When employed in a treating composition formulated to contain the gamma-aminopropyltriethoxy silane alone, as in compositions A or B, or in combination with a suitable film forming material and lubricant, as in compositions C and D, it is desirable to make use of a composition containing the anchoring agent in an amount within the range of 0.1 to 5.0 percent by weight and preferably in an amount within the range of 0.5 to 2.0 percent by weight. The following compositions are given by way of illustration of treating compositions which may be employed in this phase of the practice of this invention.

Composition A: Percent by wt.
  Gamma-aminopropyltriethoxy silane _____ 0.1–5.0
  Remainder water.

Composition B:
  Gamma-aminopropyltriethoxy silane _____ 0.5–2.0
  Glycerine _____ 0.3–0.6
  Remainder water.

Composition C:
  Partially dextrinized starch _____ 8.0
  Hydrogenated vegetable oil _____ 1.8
  Cationic wetting agent (lauryl amine acetate ___ 0.4
  Non-ionic emulsifying agent _____ 0.2
  Gamma-aminopropyltriethoxy silane _____ 1.0
  Remainder water.

Composition D:
  Polyester resin _____ 3.2
  Napcogen 16L _____ 0.1
  Triton X–100 _____ 0.1
  Polyvinyl alcohol _____ 0.1
  Polyvinyl pyrrolidone _____ 3.0
  Gamma-aminopropyltriethoxy silane _____ 0.3
  Acetic acid _____ 0.1
  Water _____ 93.2

In the foregoing examples of glass fiber treating compositions A to D, the gamma-aminopropyltriethoxy silane can be replaced, in whole or in part, with an equivalent amount of gamma - aminopropylvinyldiethoxy silane, gamma(triethoxysilylpropyl amido) propyl amine, N(gamma-triethoxysilylpropyl)propylamine, gamma(triethoxysilylpropyloxy)propylamine, beta - aminoallyltriethoxy silane, para-aminophenyltriethoxy silane, aniline silane derivatives, and other amino silane compounds or organo silicon compounds formed of a silane having at least one but not more than three hydrolyzable groups and having an organic group attached directly or through an oxygen group to the silicon atom containing less than 8 carbon atoms and also containing a free amine group. While such other amino silanes or unsaturated amino silanes can be used, the results secured from the formulations containing gamma amino propyl triethoxy silane would indicate that the latter is in a class of its own from the standpoint of the improvements that are secured from the combinations of the treated glass fibers with elastomeric materials, although substantial improvements are secured by the use of such other anchoring agents in the compositions described.

When the treated glass fibers are subsequently to be processed into yarns, cords and fabrics, it is preferred to make use of a composition in which the anchoring agent is embodied as a component in a glass fiber forming size, such as in compositions C or D, thereby to provide the glass fibers with a coating which enhances the processing as well as the performance characteristics to enable the glass fibers to be formed into such yarns, cords and fabrics and also permitting the treated glass fibers to be used as a reinforcement in combination with the elastomeric materials without previously removing the protective size composition for replacement with the anchoring agent. If the fibers are to be used directly in combination with an elastomeric material, or when the fibers are treated after the fibers have been processed into yarns or fabrics and the size originally applied has been removed, then compositions of the type illustrated by compositions A and B will be preferred.

Instead of wiping the treating composition onto the glass fibers, the treating composition can be applied by other conventional coating means and methods, such as by spray coating, roller coating, flow coating and the like. It is preferred to apply the composition directly onto bare glass fibers, as in the described forming operation, or after the original size has been removed, after the glass fibers have been otherwise sized and processed into yarns or fabrics.

Treatment of the glass fibers in forming, in accordance with the preferred practice of this invention, with composition D, results in a treated glass fiber which has low ignition loss and in which the filaments of glass fibers making up the strand are capable of easy separation to enable fuller penetration of the strand of glass fibers in the subsequent treatment to impregnate the strand or to coat the fibers with neoprene to produce the neoprene coated strand of glass fibers. It also gives a strand to which the rubber or elastomeric compound can strongly adhere.

The glass fibers, coated in accordance with Example 1, can be dried at elevated temperature but, it is the usual practice to allow the sized or coated glass fibers to air dry. The dried strands of glass fibers can be used as such, or cut to shorter lengths, for combinations with the elastomeric materials, or the fibers can be processed into yarns, twisted into cords and/or woven into fabrics for subsequent combination with the elastomeric material in the manufacture of elastomeric coated glass fiber fabrics or glass fiber reinforced molded or laminated elastomeric products.

EXAMPLE 2

Yarns of glass fibers embodying various compositions as a size were wound about a mandrel with a layer of under-vulcanized neoprene on opposite sides of the yarns of treated glass fibers. Thereafter the assembly was vulcanized by heating to a temperature of 350° F. to produce a laminate of vulcanized neoprene rubber with cords of treated glass fibers sandwiched in between.

In one instance (1) the glass fibers were previously treated with a conventional binder having the following composition:

Percent by weight partially dextrinized starch _____ 8.0
Percent by weight hydrogenated vegetable oil _____ 1.8
Percent by weight of a cationic wetting agent _____ 0.4
Percent by weight of a non-ionic emulsifying agent __ 0.2

In a second group (2), the fibers were treated with the above size composition. After the fibers were formed into the cords, the cords were heat cleaned at a temperature of about 1150° F. to burn off the size and leave the glass fibers bare in the cords that were sandwiched between the plies of the cured neoprene rubber.

In a third group (3), the fibers were heat cleaned as in group (2) but after heat cleaning the fibers were treated with a composition of the type of Composition A of Example 1 to coat the glass fibers with gamma-aminopropyltriethoxy silane before being sandwiched between the plies of neoprene.

To test adhesion between the plies of neoprene with the glass fiber cord sandwiched in between, one ply and all of the cords were gripped between one set of jaws while the other ply was gripped between another set of jaws and the force required to separate the plies was measured with the following results.

Fiber treatment:            Pounds of adhesion
  (1) _____ 9
  (2) _____ 7
  (3) _____ 17½

From the foregoing, it will be apparent that the bonded relationship is markedly increased when the glass fibers have been previously treated in accordance with the practice of this invention.

In another evaluation, the glass fibers embodying treatments (1), (2) and (3) as described above were merely pressed into the surface of an under-cured neoprene layer after which the assembly was heated for vulcanization. The force required to pull the cords from the vulcanized neoprene rubber was measured with the following results:

Fiber treatment:            Pounds of adhesion
  (1) _____ 3
  (2) _____ 5
  (3) _____ 15

It will be apparent that at least a three-fold increase in adhesion was secured by the combination which makes use of glass fibers treated with gamma-aminopropyltriethoxy silane by comparison with bare glass fibers having no treatment at all. A five-fold increase in bond strength was secured as between the fibers treated in accordance with the practice of this invention when compared with conventionally sized glass fibers.

It will be apparent from the foregoing that we have provided a new and improved method, means and materials for the production of glass fiber-elastomeric systems whereby marked improvements are secured in the end products from the standpoint of many of their physical, mechanical and chemical properties.

It will be understood that changes may be made in the details of construction, formulation and methods of application without departing from the spirit of the invention, especially as defined in the following claims.

We claim:

1. The combination of glass fibers and elastomeric material and a coating on the surfaces of the glass fibers which enhances the fuller utilization of the physical and mechanical properties of the glass fibers in the formed elastomeric system wherein the coating contains an organo silicon compound formed of a silane having from 1 to 3 highly hydrolyzable groups and an organic group attached to the silicon atom containing an amine.

2. The combination as claimed in claim 1 in which the elastomeric material comprises neoprene.

3. The combination as claimed in claim 1 in which the organo silicon compound comprises gamma-aminopropyltriethoxy silane.

4. The combination of glass fibers and a matrix of an elastomeric material wherein the glass fibers are formed with a first coating containing an organo silicon compound formed of a silane having from 1 to 3 highly hydrolyzable groups and an organic group containing an amine and a second coating of an elastomeric material in an uncured stage and wherein the elastomeric material of the second coating and of the matrix are advanced to a substantially cured stage in the final product.

5. The combination as claimed in claim 4 in which the elastomeric material coating the glass fibers comprises neoprene.

6. The combination as claimed in claim 4 in which the elastomeric material of the matrix comprises neoprene.

7. The combination as claimed in claim 4 in which both the elastomeric materials in the coating on the fibers and in the matrix comprise neoprene catalyzed with a peroxide catalyst.

8. The combination as claimed in claim 4 in which the organo silicon compound on the glass fiber surfaces comprises gamma-aminopropyltriethoxy silane.

9. In the method of producing glass fiber-elastomeric products having improved mechanical and physical properties, the steps of treating the glass fiber to coat the fibers with an organo silicon compound formed of a silane having from 1 to 3 highly hydrolyzable groups and an organic group attached to the silicon atom containing an amine, combining the treated glass fibers with the elastomeric material in an uncured stage, and then heating the combination of elastomeric material and coated glass fibers to advance the elastomeric material toward the cured stage.

10. The method as claimed in claim 9 in which the elastomeric material is neoprene.

11. The method as claimed in claim 9 in which the organo silicon compound is gamma-aminopropyltriethoxy silane.

12. The method as claimed in claim 9 in which the elastomeric material is advanced to cure with a peroxide catalyst.

13. In the method of producing glass fiber-elastomeric products having improved mechanical and physical properties, the steps of treating the glass fibers to coat the fibers with an organo silicon compound having from 1 to 3 highly hydrolyzable groups attached to the silicon atom and an organic group attached to the silicon atom containing an amine, coating the organo silicon coated glass fibers with an elastomeric material, and heating the elastomeric coated glass fibers to advance the cure of the elastomeric material to a stage less than the fully cured stage.

14. The method as claimed in claim 13 in which the elastomeric material is neoprene.

15. The method as claimed in claim 13 in which the organo silicon compound is gamma-aminopropyltriethoxy silane.

16. The method as claimed in claim 13 which includes the step of twisting a plurality of the coated glass fibers to form a yarn.

17. The method as claimed in claim 16 which includes the step of plying the yarns of glass fibers to form cords.

18. The method of producing glass fiber-elastomeric products having improved mechanical and physical properties comprising the steps of treating the glass fibers to coat the fibers with an organo silicon compound formed of a silane having from 1 to 3 highly hydrolyzable groups and an organic group attached to the silicon atom containing an amine, coating the organo silicon coated glass fibers with an elastomeric material in an uncured stage, heating the elastomeric coated glass fibers to advance the cure of the elastomer but to a stage less than the fully cured state, combining the elastomeric coated glass fibers with the elastomeric material forming the matrix of the elastomeric product with the latter in an uncured stage and then advancing the elastomeric materials to the cured stage.

References Cited by the Examiner

UNITED STATES PATENTS

| | | | |
|---|---|---|---|
| 2,468,086 | 4/1949 | Latham et al. | |
| 2,762,717 | 9/1956 | Clark. | |
| 2,763,573 | 9/1956 | Biefield | 117—126 |
| 2,799,598 | 7/1957 | Biefield et al. | |
| 2,819,245 | 1/1958 | Shorr | 57—140 |
| 2,827,099 | 3/1958 | Youngs | 117—126 |
| 2,832,754 | 4/1958 | Jex | 57—140 |
| 2,903,779 | 9/1959 | Owens | 28—80 |
| 2,931,739 | 4/1960 | Marzocchi et al. | 117—126 |
| 2,952,576 | 9/1960 | Wheelock et al. | 117—126 |
| 2,958,114 | 11/1960 | Marzocchi et al. | 57—140 |
| 3,040,413 | 6/1962 | Marzocchi et al. | 19—66 X |
| 3,081,195 | 3/1963 | Biefield et al. | 117—126 |

MERVIN STEIN, *Primary Examiner.*